United States Patent [19]

Sensi et al.

[11] Patent Number: 4,741,749
[45] Date of Patent: May 3, 1988

[54] VERTICAL DELIVERY ARRANGEMENT FOR FLOAT GLASS PROCESS

[75] Inventors: John E. Sensi, Arnold; Gerald E. Kunkle, New Kensington, both of Pa.

[73] Assignee: PPG Industries, Inc., Pittsburgh, Pa.

[21] Appl. No.: 224

[22] Filed: Jan. 2, 1987

[51] Int. Cl.[4] .............................................. C03B 18/16
[52] U.S. Cl. ....................... 65/99.2; 65/99.5; 65/182.1; 65/182.5
[58] Field of Search ............... 65/99.5, 94, 99.1, 99.2, 65/182.3, 182.5, 182.1, 99.4, 182.4

[56] References Cited

U.S. PATENT DOCUMENTS

| | | | |
|---|---|---|---|
| 3,220,816 | 11/1965 | Pilkington | 65/99 |
| 3,305,339 | 2/1967 | Plumat | 65/99 |
| 3,318,671 | 5/1967 | Brichard et al. | 65/65 |
| 3,468,649 | 9/1969 | De Lajarte et al. | 65/182 |
| 3,488,175 | 1/1970 | Montgomery | 65/99 |
| 3,679,389 | 7/1972 | Kanai | 65/99 |
| 3,765,857 | 10/1973 | Lecourt | 65/91 |
| 3,843,344 | 10/1974 | Galey | 65/99 |
| 3,843,346 | 10/1974 | Edge et al. | 65/65 |
| 4,162,907 | 7/1979 | Anderson | 65/29 |
| 4,203,750 | 5/1980 | Shay | 65/99 |
| 4,361,431 | 11/1982 | Kandachi et al. | 65/99.5 |
| 4,395,272 | 7/1983 | Kunkle et al. | 65/99.5 |
| 4,600,426 | 7/1986 | Schwenninger | 65/330 |
| 4,610,711 | 9/1986 | Matesa et al. | 65/134 |

Primary Examiner—Arthur Kellogg
Attorney, Agent, or Firm—Dennis G. Millman

[57] ABSTRACT

Delivery of molten glass to a flat glass forming operation carried out as a substantially free-falling vertical stream. The glass may be received in a first chamber in a relatively deep and narrow reservoir, from which it flows to a wider chamber, from which, in turn, it is drawn longitudinally.

14 Claims, 2 Drawing Sheets

VERTICAL DELIVERY ARRANGEMENT FOR FLOAT GLASS PROCESS

BACKGROUND OF THE INVENTION

This invention relates to the float process for forming flat glass in which molten glass is passed onto a pool of molten metal (usually consisting chiefly of molten tin) upon which the molten glass floats as it attains a smooth surface and is attenuated to the desired thickness. More particularly, the invention relates to improvements in delivering the molten glass from melting and refining means to the float-forming chamber.

In the float-forming process it has been recognized that the arrangement by which the molten glass is initially deposited onto the molten metal pool is critical for the sake of attaining the optical quality desired for flat glass. Glass that has been thoroughly refined and homogenized when passing through the canal or other vessel connecting the melting and refining apparatus with the forming chamber becomes slightly contaminated at least on its bottom portion by contact with the ceramic refractory materials from which the delivery structure is made. This contamination is known to produce distortion in the glass sheets produced from this glass. In early float processes, as typified by U.S. Pat. No. 3,220,816 (Pilkington), the molten glass was delivered onto the molten tin by means of a spout that produces a freely falling band of molten glass, a portion of which flows rearwardly and then outwardly upon initially encountering the molten metal. This flow pattern served the purpose of diverting the contaminated bottom surface portion of the molten glass stream to edge portions of the glass ribbon that subsequently formed in the float chamber. These edge portions could be trimmed away and discarded, and the central portion of the ribbon would be relatively free from refractory-induced distortion.

A different approach to this problem is disclosed in U.S. Pat. No. 3,843,346 (Edge et al.). There, only a surface portion of the molten glass is drawn from the melting furnace into the forming chamber, thereby avoiding refractory contaminated glass in all portions of the glass ribbon being made. However, even in that arrangement, a small amount of refractory contact is necessitated by the presence of a threshold member over which the glass flows immediately prior to contacting the molten metal. Although the threshold member can be made of relatively pure non-contaminating refractory material, its gradual erosion can contribute to some distortion defects in the glass, and it requires occasional replacement in order to maintain the desired standards of quality in the glass produced. Accordingly, it would be desirable to minimize refractory contact with molten glass as it is being delivered into the forming chamber.

In U.S. Pat. No. 3,843,344 (Galey), there is shown an arrangement in which the threshold is located upstream from the upper glass flow control member known as the tuile or "tweel." Such an arrangement may reduce the shear forces on the threshold and thus reduce erosion of the threshold, but, nevertheless, entails some refractory contact of the glass by the threshold as well as the tweel. A similar arrangement is shown in U.S. Pat. No. 4,395,272 (Kunkle et al.).

U.S. Pat. Nos. 3,468,649 (Delajarte et al.) and 3,765,857 (Lecourt) both show a cylindrical conduit delivering molten glass to a float-forming chamber. Neither patent discloses the material from which such a conduit could be fabricated nor any details of the construction or purpose of such a conduit. Since both of these patents deal primarily with other features, it appears that the conduit shown in each is merely an abstract schematic depiction of glass delivery means to a float-forming chamber.

U.S. Pat. Nos. 3,318,671 (Brichard et al.); 3,488,175 (Montgomery); and 3,679,389 (Kanai) each show forming a sheet of glass which is passed in a substantially vertical direction onto a molten metal bath. In order for the glass ribbon to be self-supporting in such an arrangement, the glass viscosity must be relatively high, and, therefore, significant smoothing or attenuation of the glass ribbon on the molten metal bath cannot be achieved unless the glass is significantly reheated while it is on the molten metal. Reheating detracts from the energy efficiency of the process. In U.S. Pat. No. 4,203,750 (Shay), a seemingly less viscous ribbon of glass is directed onto a molten metal bath where it is attenuated by means of edge rollers. Nevertheless, the viscosity of the glass would appear to be relatively high in order to permit shaping of the ribbon prior to delivery onto the bath, and the preliminary shaping of the ribbon entails significant refractory contact which may be undesirable from a contamination and optical distortion standpoint.

In U.S. Pat. No. 4,162,907 (Anderson), discrete gobs of molten glass are extruded onto a small bath of molten tin. Because such an arrangement is discontinuous its throughput rate is limited, and it disadvantageously depends upon a complex mechanism having many moving parts to deliver molten glass onto the molten metal.

It would be desirable if an arrangement could be provided for delivering molten glass continuously onto a molten metal pool for forming into flat glass by a float process that avoids the drawbacks of the prior art set forth above.

SUMMARY OF THE INVENTION

In the present invention molten glass is delivered into a flat glass forming chamber as a vertically falling, substantially cylindrical stream. The stream enters through the roof of the forming chamber, and no structure need be provided within the forming chamber for directing or shaping the stream as it enters the chamber. The molten glass is initially received in the forming chamber in a reservoir in which the glass is relatively deep and from which the glass flows and spreads to form a relatively thin ribbon on a pool of molten metal. Preferably the molten glass in the reservoir also rests on a layer of molten metal, thereby isolating a substantial surface area of the glass from contaminating refractory contact. The molten metal may extend continuously from the reservoir to the remainder of the forming chamber.

The reservoir in which the molten glass is initially received in the forming chamber is preferably relatively deep and narrow. In the preferred embodiments spreading of the molten glass to approximately the desired width of the product ribbon is accomplished in an intermediate zone where the glass is permitted to flow into contact with relatively widely spaced side walls, whereby the glass layer is substantially reduced in thickness. Subsequently, the glass is drawn into a downstream portion of the forming chamber of even greater width, in which the glass is spaced from the side walls and is drawn with traction means so as to achieve the final desired thickness in the glass ribbon.

The vertical delivery, the gathering of glass in the reservoir, and the spreading in the intermediate zone entail glass temperatures higher than those employed in a conventional float forming chamber. Because the glass in those stages is required to flow freely, its viscosity must be relatively low. Thus, for soda-lime-silica flat glass of conventional commercial composition, the temperature of the glass in the reservoir is preferably at least 2100° F. (1150° C.) and optimally around 2400° F. (1310° C.). The glass temperature is permitted to fall as the glass progresses through the intermediate spreading stage, and as the ribbon separates from the side walls, its temperature is typically about 1800° F. (980° C.) to 2100° F. (1150° F.).

Permitting the glass to flow to substantially the final ribbon width at high temperatures is advantageous because at low viscosities wave type surface defects decay relatively rapidly, thereby enabling production of glass of improved optical quality. The free flow of low viscosity glass, and thus the rapid attainment of ribbon width, permits the use of relatively short, economical forming chambers. Providing glass to a forming chamber at the high temperatures involved in such a process would cause rapid erosion of conventional glass delivery arrangements. The erosion not only objectionably contaminates the glass, but also entails costly replacement of delivery region refractories. Therefore, the vertical delivery system is advantageous for introducing high temperature glass to that type of forming operation.

Because the glass stream entering the forming chamber need not be shaped by flow guide means and is freely falling, the system is freed from the need to provide a channel structure or the like for carrying molten glass from the melter to the forming chamber. This not only avoids a potential source for contaminating the glass, but also provides greater freedom for selecting materials at the melter outlet. Specifically, the melter outlet orifice and valve arrangement may be fabricated from platinum, which is normally precluded from use in a forming chamber entrance structure due to the reducing atmosphere conventionally maintained in a forming chamber to preserve the molten metal. Although platinum possesses excellent corrosion resistance in contact with molten glass, it is not durable under reducing conditions. A valve arrangement at the melter outlet may be employed to control the flow of molten glass to the reservoir section of the forming chamber. A tuile (or "tweel") may be provided to adjustably regulate flow of molten glass from the reservoir to the intermediate chamber, but the tweel and the refractory contact it entails may be eliminated by relying on the melter outlet valve for controlling the glass flow rate.

The reservoir provides a convenient location for stirring the molten glass after delivery into the forming chamber so as to alleviate the optical distortion effects caused by inhomogeneities in the glass. Glass that has been thoroughly refined and delivered to the forming chamber without significant contamination from the refractory vessel need not be homogenized. Glass that is intended for use other than as transparent glazing may have lower standards for optical uniformity and thus may also avoid the need for stirring. Although the delivery of molten glass to the forming chamber of the present invention substantially reduces the potential for refractory contamination, it may be found that inhomogeneities are present in the glass prior to entering the delivery zone. Since the delivery arrangement of the present invention does not provide for diverting the more contaminated portions of the glass to marginal portions of the glass ribbon, the use of stirring in combination with the present invention is preferred when producing flat glass for transparency use.

Other features of the invention will be evident from the drawings and the following description of specific embodiments.

THE DRAWINGS

DETAILED DESCRIPTION

Figure 1:
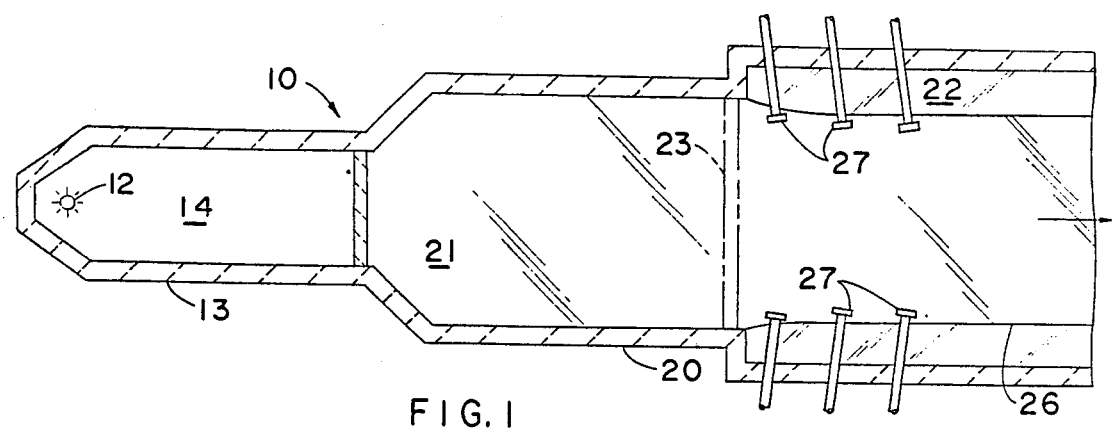
FIG. 1 is a schematic plan view of a forming chamber in accordance with the present invention, with the top cut away.
Figure 2:
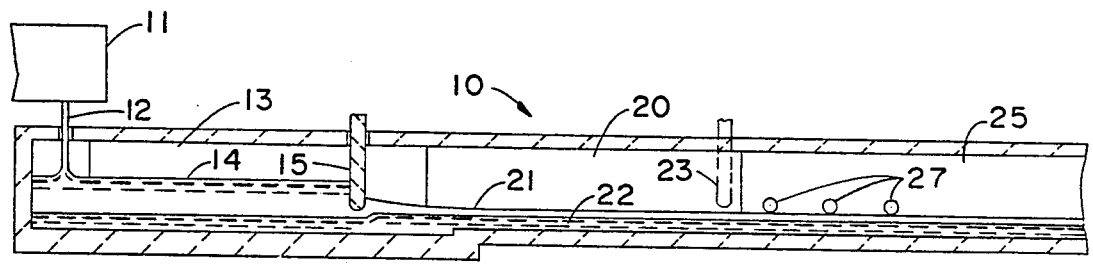
FIG. 2 is a schematic cross-sectional side view of the forming chamber of FIG. 1.

Referring to FIGS. 1 and 2, there is shown a general layout of a forming chamber 10 in accordance with one embodiment of the present invention. The forming chamber is associated with a source of molten glass 11 which may be a melting furnace of any type known in the art. More specifically, molten glass delivered to the forming chamber in most cases will have been subjected to a refining process subsequent to melting, and in some cases to a thermal conditioning step as well. Therefore, it should be understood that the source of molten glass 11 could be a refining vessel or conditioning vessel, any of which may be referred to herein as "melter" for the sake of simplicity. A vertically falling stream of glass 12 flows from the melter 11 and passes through an opening in the roof of the forming chamber 10, and is received in a first zone 13 of the forming chamber. A reservoir of molten glass 14 is retained in the first zone 13 behind a vertically adjustable tweel 15 which adjustably regulates the flow of molten glass from the first zone to an intermediate zone 20. FIG. 2 depicts the preferred arrangement wherein a layer of molten metal 22 extends throughout the forming chamber, including the first chamber 13. The molten metal is preferably tin which may include minor amounts of other elements, such as iron and copper. In the first zone 13 the provision of molten metal is preferred for the sake of providing a non-contaminating contact surface on the bottom of the glass reservoir 14. Some aspects of the present invention do not require the presence of the molten metal in zone 13.

The intermediate zone 20 is provided with greater width than the first zone 13, and molten glass 21 within the intermediate zone is provided with sufficiently low viscosity so that the glass spreads into contact with the side walls. The width attained by the glass in the intermediate zone 20 is preferably approximately that of the final glass ribbon being produced. As the regulated amount of glass flows under the tweel 15 and spreads in the intermediate zone 20, its thickness decreases, approaching or equaling the equilibrium thickness at the end of the intermediate zone. An option is to provide a seal barrier 23 shown in phantom in FIGS. 1 and 2 at the end of the intermediate zone 20, so as to permit the gas above the glass 21 in the intermediate zone to be pressurized above atmospheric pressure, whereby the glass thickness may be reduced below the equilibrium thickness in the intermediate zone. This optional technique is in accordance with U.S. Pat. No. 4,395,272 (Kunkle et al.).

With continued reference to FIGS. 1 and 2, the third zone 25 of the forming chamber resembles a conventional float forming chamber. The side walls of the third zone 25 are spaced apart further than those in the intermediate zone 20 so that the edges of the ribbon of glass 26 are spaced therefrom. Edge gripping means such as conventional toothed wheels 27 may engage opposite marginal edge portions of the ribbon 26 in the third zone so as to control ribbon width. In those embodiments where the glass enters the third zone at or slightly above the equilibrium thickness, the edge gripping devices maintain the ribbon width or reduce the loss of ribbon width as the ribbon is stretched longitudinally when thicknesses below equilibrium are being produced. In those embodiments where the glass thickness has been reduced below equilibrium in the intermediate zone, the edge gripping devices serve to maintain the ribbon width and thereby to preserve the reduced thickness. The number and spacing of the edge gripping devices may vary considerably in accordance with particular production requirements.

The free flowing nature of the molten glass in the first and second zones of the forming process of the present invention are indicative of lower viscosity and higher temperatures than conventionally employed in float forming processes. Glass temperatures throughout the first zone 13 and at least the upstream portion of the intermediate zone 20 are at least 2100° F. (1150° C.). As the glass exits the intermediate zone 20, its temperature may have fallen to as low as 1800° F. (980° C.). Since the glass is cooling as it progresses through the forming chamber, considerably higher temperatures will be present in upstream portions of the forming chamber. For example, the glass in the reservoir 14 is preferably at a temperature of at least 2200° F. (1200° C.). Such temperatures are particularly preferred if the glass is to be stirred in the first zone. The stream of glass 12 entering the forming chamber may be at correspondingly higher temperatures, typically falling in the vicinity of 2300° F. (1260° C.) to about 2400° F. (1315° C.). There is no essential upper limit on the temperature of the glass entering the first zone, but as a practical matter it is most likely that the glass would be somewhat below the peak refining temperature imparted to the glass in the upstream melting and refining process, which would typically be no greater than about 2800° F. (1500° C.). As a further practical matter, permitting the glass to cool substantially before entering the forming chamber would be preferred in some cases to extend the life of elements such as the valve means and the refractory side walls of the forming chamber. At these relatively high temperatures, a significant advantage is provided by the layer of molten metal 22 beneath the glass in the first and second zones of the forming chamber for the sake of isolating the molten glass from contact with ceramic refractory materials which would have a significant contaminating effect on the molten glass at those temperatures. Likewise, it is significant that the high temperature stream of glass 12 need not contact ceramic refractory structural elements.

The temperatures given herein are with reference to a conventional soda-lime-silica commercial float glass composition. For other compositions the appropriate temperatures will vary in accordance with the temperature/viscosity relationship of the particular glass composition. In order to extrapolate the temperatures disclosed herein to other glass compositions, the relationship between temperature and viscosity of a specific example of soda-lime-silica float glass is set forth below:

| Viscosity (Poise) | Temperature |
| --- | --- |
| 100 | 2630° F. (1443° C.) |
| 1,000 | 2164° F. (1184° C.) |
| 10,000 | 1876° F. (1024° C.) |
| 100,000 | 1663° F. (906° C.) |

Figure 3:
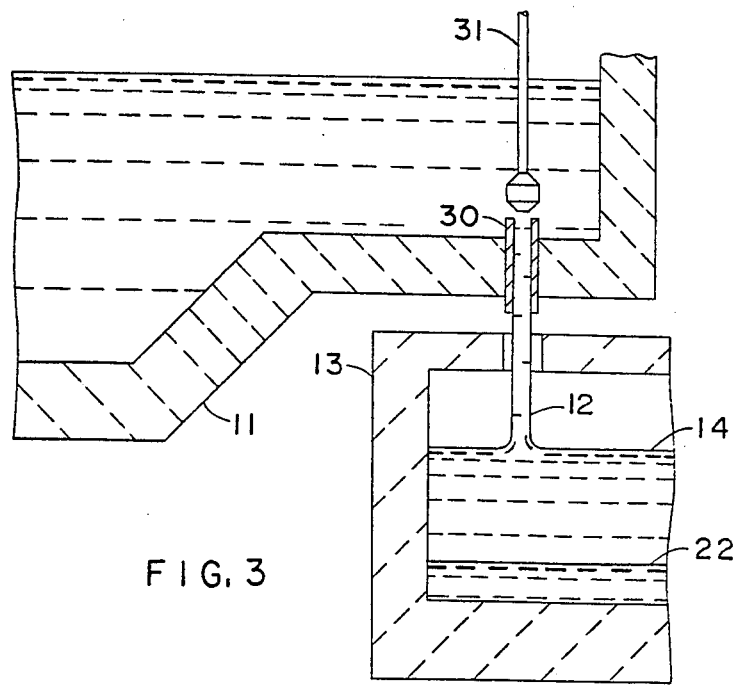
FIG. 3 is an enlarged cross-sectional side view of the delivery section of the forming chamber of FIG. 1 and 2, showing one embodiment for vertical delivery of molten glass to the forming chamber in accordance with the present invention.

FIG. 3 shows details of an example of a valve arrangement for regulating the flow of molten glass from the melter or refiner 11 into the forming chamber. In this example, a tube 30 of refractory metal such as platinum extends through the floor of the refractory vessel 11 and defines a drain orifice through which passes the stream of glass 12. A vertically adjustable plunger 31, which may also be fabricated of or clad with a refractory metal such as platinum, serves to regulate the flow of molten glass through the tube 30. The plunger and drain tube arrangement is conventional in some portions of the glass industries, such as bottle making and the components are readily available commercially, but the use of such an arrangement in a flat glass forming operation is novel. The source of molten glass 11 depicted in FIG. 3 represents the end portion of a horizontal tank-type melting furnace commonly employed in the glass industry. The terminal portion of such as furnace may constitute a forehearth in which the glass may be thermally conditioned and homogenized.

In order to prevent the molten metal in a float forming chamber from oxidizing excessively, it is conventional to maintain a non-oxidizing atmosphere within the forming chamber, typically consisting of an inert gas such as nitrogen and small amounts of a reducing gas such as hydrogen. In the present invention, where the molten glass 14 completely covers the molten metal 22 in the first zone 13, and the tweel 15 isolates the first chamber atmosphere from the remainder of the forming chamber, it may be unnecessary to provide a reducing atmosphere in the first zone. In that case the tube 30 of the FIG. 3 embodiment may extend into the first zone 13 of the forming chamber since the platinum from which it is preferably constructed will not be subjected to the corrosive effects of a reducing atmosphere. Extending the tube 30 to within a short distance above the surface of the reservoir of glass 14 is preferred in order to prevent coiling and entrapment of air as the stream 12 enters the reservoir. It would also be feasible for the tube to extend below the surface of the glass 14. It should be understood that reference to platinum herein is intended to include alloys of platinum, in particular the alloys of platinum with rhodium commonly employed for glass contact applications.

Figure 4:
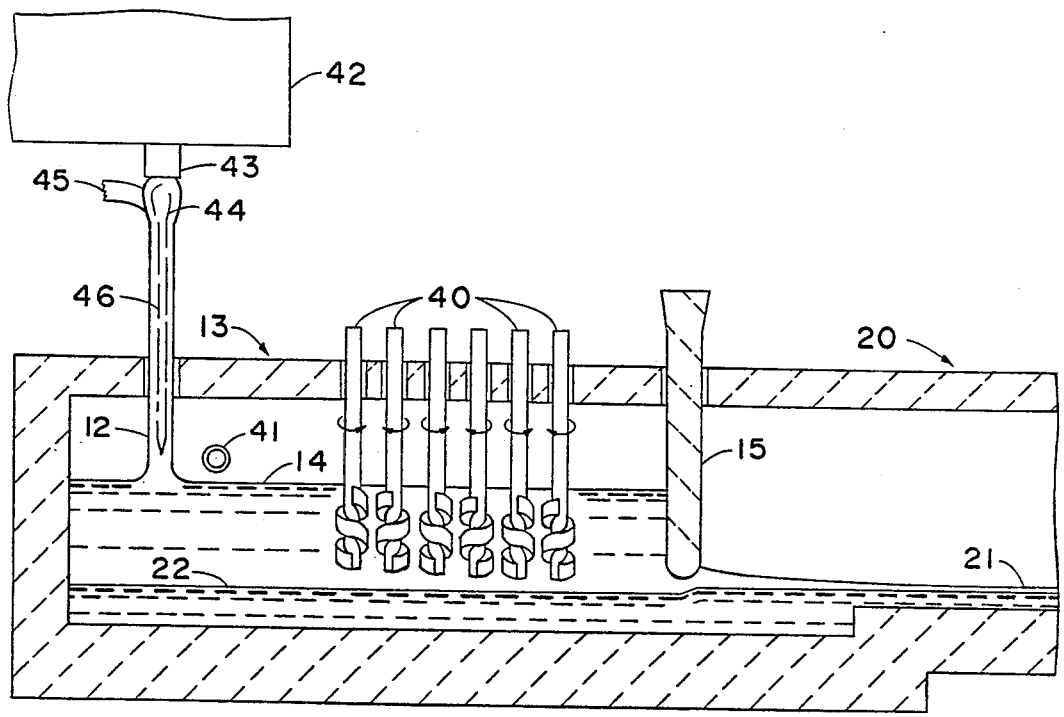
FIG. 4 is an enlarged cross-sectional side view of the delivery and reservoir section of the forming chamber of FIGS. 1 and 2, showing a preferred embodiment for vertical delivery of molten glass to the forming chamber in accordance with the present invention, also showing an arrangement for stirring the glass.

FIG. 4 shows the preferred embodiment of the present invention and includes a plurality of stirrers 40 for stirring the reservoir of glass 14 within the first zone 13 of the forming chamber. The stirrers are preferably provided in an array, with a plurality of stirrers in each of a plurality of rows. The precise number of stirrers required will depend upon the degree of homogenization desired and the stirring action of the particular stirrer design selected. The stirrers depicted in FIG. 4 are a helical type, but any glass stirrer design known in the art may be employed. When stirring is employed, it is feasible to add colorants or other additives to the glass upstream from the stirrers in the first zone 13. For this purpose, a screw feeder 41 may be provided extending into the chamber through a side wall.

A source of molten glass 42 in the FIG. 4 embodiment may be of the type previously described in connection with other embodiments, or it may be a less conventional type of melter or refiner. For example, a vertically oriented refiner such as that disclosed in U.S. Pat. No. 4,610,711 (Matesa et al.) may be employed to deliver molten glass to the forming process of the present invention. The source of molten glass 42 is provided with an outlet tube 43 which is preferably fabricated of a refractory metal such as platinum. In this embodiment an arrangement to regulate the flow of molten glass is provided on the exterior of the molten glass source 42. This valve arrangement is in accordance with U.S. Pat. No. 4,600,426 (Schwenninger) and includes a bulbous member 44 supported on a laterally extending arm 45, which is, in turn, supported with provision for vertical adjustment. In order to prevent coiling of the glass and entrapment of air therein, an elongated tail piece 46 may extend downwardly from the bulbous member 42 into the forming chamber to an elevation slightly above or preferably at or below the level of the glass 14 held in the first chamber. The elements of this valve arrangement are preferably fabricated from a refractory metal such as platinum or molybdenum.

Figure 5:
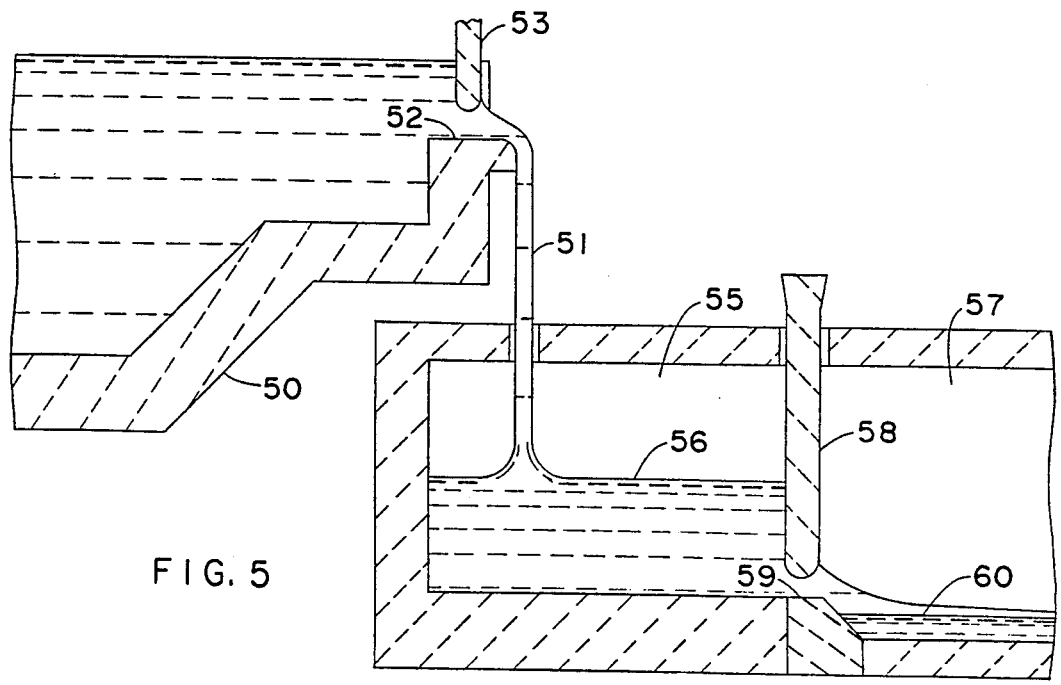
FIG. 5 is an enlarged cross-sectional side view of the delivery section of the forming chamber of FIGS. 1 and 2, showing an alternative embodiment of the present invention.

Turning now to FIG. 5, there is shown an embodiment that foregoes many of the preferred features, but nevertheless represents a novel arrangement for delivering molten glass to a flat glass forming operation within the scope of the broadest aspects of the present invention. The variations shown in FIG. 5 may be used together as shown or may be used separately in the other embodiments disclosed. FIG. 5 shows a conventional melter or refiner 50 from which a stream of glass 51 is drained from an end portion rather than a bottom drain orifice. In the example depicted, the glass is drained through a narrow trough 52 having a vertically adjustable gate 53 for varying the rate of flow. The width of the trough 52 is preferably minimized so as to minimize the surface area of refractory contact, but may be somewhat rectangular in cross-section. However, the vertically falling stream of glass 51 will tend to assume a cylindrical shape due to surface tension and the relatively large distance of free fall. If desired the trough 52 could be lined with platinum or other non-contaminating material. The first zone 55 of the forming chamber holds a reservoir of glass 56, but is not provided with the preferred molten metal layer between the glass and the refractory bottom. Some or all of the glass contact surfaces within the zone 55 may be clad with platinum or other non-contaminating refractory material. The reservoir 56 is relatively deep and narrow as in previous embodiments. The flow of glass from the first zone 55 to a second zone 57 is regulated between a vertically adjustable tweel 58 and a threshold member 59 which is preferably of a non-contaminating refractory material such as fused quartz. The glass in the intermediate zone 57 is permitted to flow to a greater width on a pool of molten metal 60 as in previous embodiments.

The present invention has been described in connection with specific examples, but it should be understood that other variations and modifications as would be known to those skilled in the art may be resorted to without departing from the scope of the invention as defined by the claims which follow.

We claim:

1. A method wherein a stream of molten refined glass is fed from a source of molten glass onto a pool of molten metal within a forming chamber so as to form a flat ribbon of glass, characterized by initially feeding the molten glass through a roof portion of the forming chamber as an uncontained, vertically falling stream into a reservoir of molten glass supported on a layer of molten metal, and drawing glass from the reservoir to form the flat ribbon on molten metal.

2. The method of claim 1 wherein the falling stream has a free surface that is substantially cylindrical.

3. The method of claim 1 wherein the falling stream enters the forming chamber at a temperature above 2100°F. (1150°C.).

4. The method of claim 1 wherein the falling stream enters the forming chamber at a temperature above 2200°F. (1200°C.).

5. The method of claim 1 wherein the molten glass is in contact with the forming chamber walls.

6. The method of claim 1 wherein the falling stream is not in contact with ceramic refractory material.

7. The method of claim 5 wherein molten glass spreads as it is withdrawn from the reservoir as forming of the flat ribbon is initiated.

8. A method of forming glass into a flat ribbon wherein a stream of molten glass is fed onto a pool of molten metal in a forming chamber, characterized by gathering the incoming stream of molten glass in a first zone of the forming chamber at a relatively narrow width and large depth with glass in contact with side walls, metering glass from the first zone to a second zone of the forming chamber where the glass is permitted to spread to an increased width in contact with side walls and wherein the glass depth is reduced, and passing the glass to a third zone of the forming chamber where the glass is separated from the side walls and is attenuated to form a glass ribbon of desired thickness.

9. The method of claim 8 wherein the glass is supported on molten metal in the third zone.

10. The method of claim 9 wherein the glass is supported on molten metal in the second zone.

11. The method of claim 10 wherein the glass is supported on molten metal in the first zone.

12. The method of claim 8 wherein the glass in the first zone is at a temperature of at least 2100° F.

13. The method of claim 8 wherein a pressure greater than atmospheric is maintained in the second zone so as to reduce the glass thickness.

14. A method of forming flat glass comprising:
establishing a vertically falling stream of molten glass free of external contact at an elevation above a forming chamber;

permitting the molten glass stream to fall vertically to an elevation below the roof of the forming chamber;

receiving the molten glass in a reservoir on a pool of molten metal withing the forming chamber; and forming the glass into a flat ribbon by drawing glass from the reservoir while supported on the molten metal in the forming chamber.

* * * * *